US009470818B2

(12) United States Patent
Akhlaq et al.

(10) Patent No.: US 9,470,818 B2
(45) Date of Patent: Oct. 18, 2016

(54) SAND AND DUST STORM DETECTION METHOD

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Muhammad Akhlaq, Hafr Al-Batin (SA); Tarek R. Sheltami, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 542 days.

(21) Appl. No.: 13/909,015

(22) Filed: Jun. 3, 2013

(65) Prior Publication Data
US 2014/0358442 A1    Dec. 4, 2014

(51) Int. Cl.
G01W 1/10 (2006.01)
G01W 1/02 (2006.01)
G01W 1/00 (2006.01)

(52) U.S. Cl.
CPC G01W 1/02 (2013.01); G01W 1/00 (2013.01)

(58) Field of Classification Search
CPC ............................... G01W 1/00; G01W 1/02
USPC ......... 702/3, 47, 96, 98, 104, 130, 138, 141, 702/142, 143, 188; 340/870.11, 971; 382/173; 250/226
See application file for complete search history.

(56) References Cited

U.S. PATENT DOCUMENTS

| | | | |
|---|---|---|---|
| 5,757,322 A | 5/1998 | Ray et al. | |
| 7,242,803 B2 * | 7/2007 | Miller | G01W 1/00 250/226 |
| 7,365,674 B2 | 4/2008 | Tillotson et al. | |
| 7,492,305 B1 | 2/2009 | Woodell et al. | |
| 7,612,688 B1 | 11/2009 | Vigeant-Langlois et al. | |
| 8,089,391 B1 | 1/2012 | Woodell et al. | |
| RE43,903 E | 1/2013 | Brown | |
| 2006/0106540 A1 | 5/2006 | Campbell | |
| 2008/0287144 A1 | 11/2008 | Sabata et al. | |

OTHER PUBLICATIONS

Akhlag et al., "Developing a Hybird System for Sand and Dust Storm Detection using Satellite Imaging and WSNs", iiWAS2012, Dec. 3-5, 2012, Bali, Indonesia.*
Muhammad Akhlaq, Tarek R. Sheltami and Hussein T. Mouftah, "A review of techniques and technologies for sand and dust storm detection", Reviews in Environmental Science and Bio/Technology, May 2012, vol. 11, Issue 3, pp. 305-322.

* cited by examiner

Primary Examiner — John H Le
(74) Attorney, Agent, or Firm — Richard C. Litman (57) ABSTRACT

The sand and dust storm detection method utilizes a hybrid design of a sand and dust storm detection system (SDSDS) having a wireless sensor network (WSN) and a satellite imaging system that detects sand and dust storm events of all types. A layered architecture of context-aware middleware is used. While the WSN provides real time data from the area of interest, near-real time METEOSAT MSG images are obtained from the METEOSAT web site.

7 Claims, 6 Drawing Sheets

SAND AND DUST STORM DETECTION METHOD

BACKGROUND OF THE INVENTION

1. Field of the Invention

The present invention relates to meteorological event detection, and particularly to a sand and dust storm detection method.

2. Description of the Related Art

Sand and dust storms (SDSs) offer very serious hazards to the environment, economy and health. An early warning of an upcoming SDS would allow people to take precautionary measures. Traditionally, satellite imaging is used to detect large-scale and long-term SDSs. However, small-scale and short-term SDSs may go undetected due to the poor spatial and temporal resolution of satellites.

Sand and dust storms (SDSs) appear frequently in the Middle-East, Australia, North-Africa, and North China during spring, winter and early summer. There are four main types of SDSs, including small-scale SDS (covers a small geographic area), large-scale SDS (covers a vast geographic area), short-term SDS (exists for a few minutes or hours), and long-term SDS (exists for many days or months).

An early warning of an upcoming SDS can help in avoiding serious consequences by letting people take some preventive measures. However, this requires continuous monitoring of sand and dust in the area of interest. Several technologies are available for sand and dust monitoring, including video-surveillance, sensory information, satellite imagery, unmanned aerial vehicles, etc. However, a particular technology is suitable only for the specific type of SDS. For example, satellite imaging can detect only large-scale and long-term SDSs due to poor spatial and temporal resolution of the images, while WSNs can detect SDSs of all types, except for large-scale SDSs due to their deployment in a limited area.

Thus, a sand and dust storm detection method solving the aforementioned problems is desired.

SUMMARY OF THE INVENTION

The sand and dust storm detection method is a hybrid design of sand and dust storm detection method (SDSDM) using a wireless sensor network (WSN) and satellite imaging in order to detect SDSs of all types. A layered architecture of a context-aware system is used. While the WSN provides real time data from the area of interest, near-real time METEOSAT MSG (Meteosat Second Generation) images are obtained from the EUMETSAT (European Organization for the Exploitation of Meteorological Satellites) web site. An experimental prototype is developed for evaluation of the present system. Performance studies show that such a hybrid approach can effectively detect and predict SDSs of all types.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The sand and dust storm detection method uses a hybrid combination of a wireless sensor network (WSN) and an imaging satellite in order to detect SDSs of all types. The present method provides a layered architecture of context-aware middleware. While the WSN provides real-time data from the area of interest, near-real time METEOSAT MSG images are obtained from the METEOSAT web site.

For example, in the present method a WSN may be deployed in a small area of the Arabian Desert to get accurate, firsthand, real-time and continuous data from the source of an SDS. Near-real time images from Meteosat RGB Composites Dust for Eastern Africa are stored and used to detect any large-scale SDS in areas close to the WSN deployment. Meteosat calculates the RGB Composite by using the difference of channels as: R=IR12.0−IR10.8, G=IR10.8−IR8.7, and B=IR10.8. Such a hybrid approach improves the system performance in terms of accuracy, energy consumption and cost. The present sand and dust storm detection method using a WSN and satellite imaging detects SDSs of all types.

Figure 1:
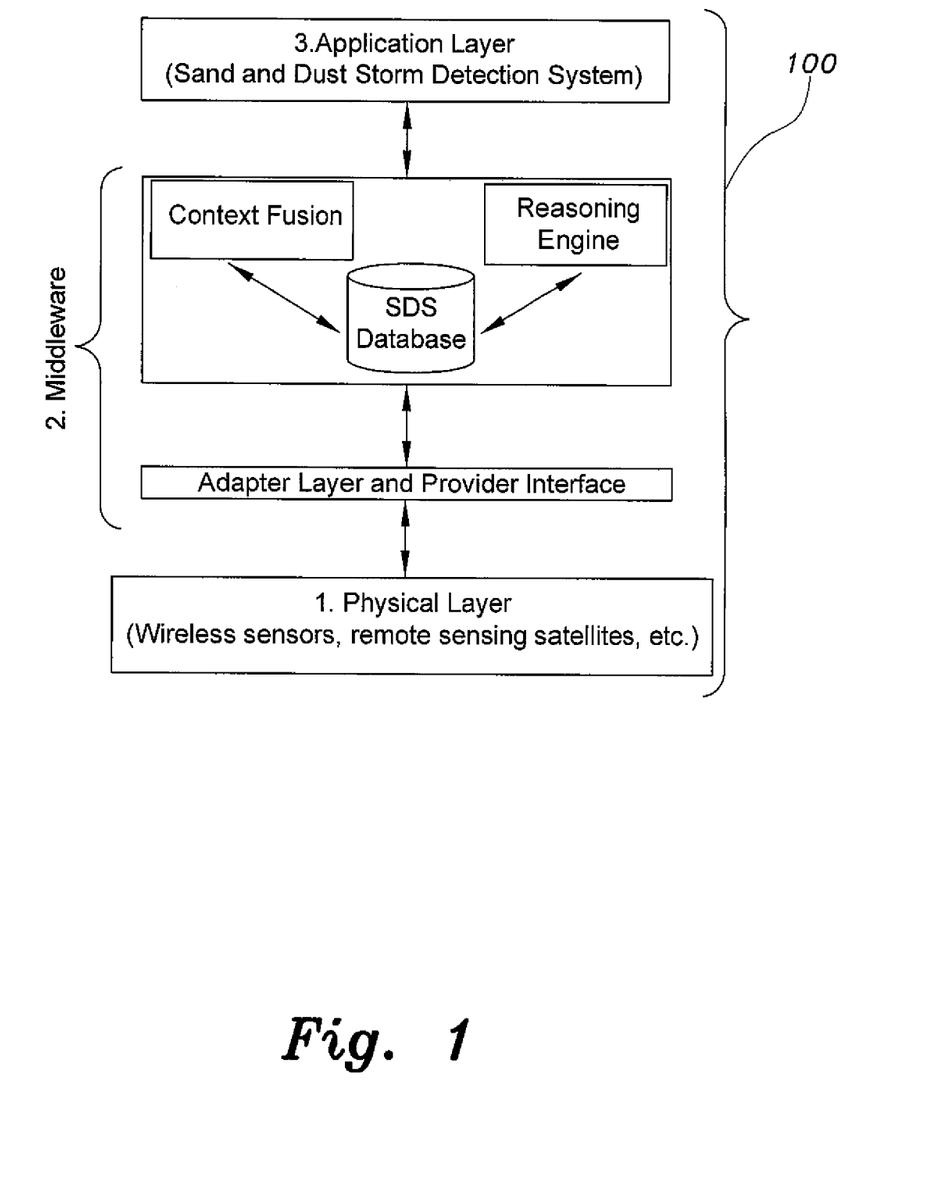
FIG. 1 is a block diagram of the architecture of a sand and dust storm detection system according to the present invention.

The present method's layered architecture 100 includes a physical layer, middleware, and an application layer as shown in FIG. 1. The system model 200 includes the Physical Layer comprising wireless sensors 202 (shown in FIG. 2), which are deployed in the desert, and remote sensing satellites providing the satellite images, which are downloadable from a web site 210. The Meteosat MSG satellite provides RGB Composites Dust images every hour. The WSN includes motes, which house the sensors for GPS, atmospheric pressure, surface temperature, humidity, wind velocity, and soil moisture. Each sensor mote also houses a gateway that connects wirelessly to a router 204. The router 204 sends the sensor data to a database server 208 in the control room using 3G+ technology 206, as shown in FIG.

Figure 2:
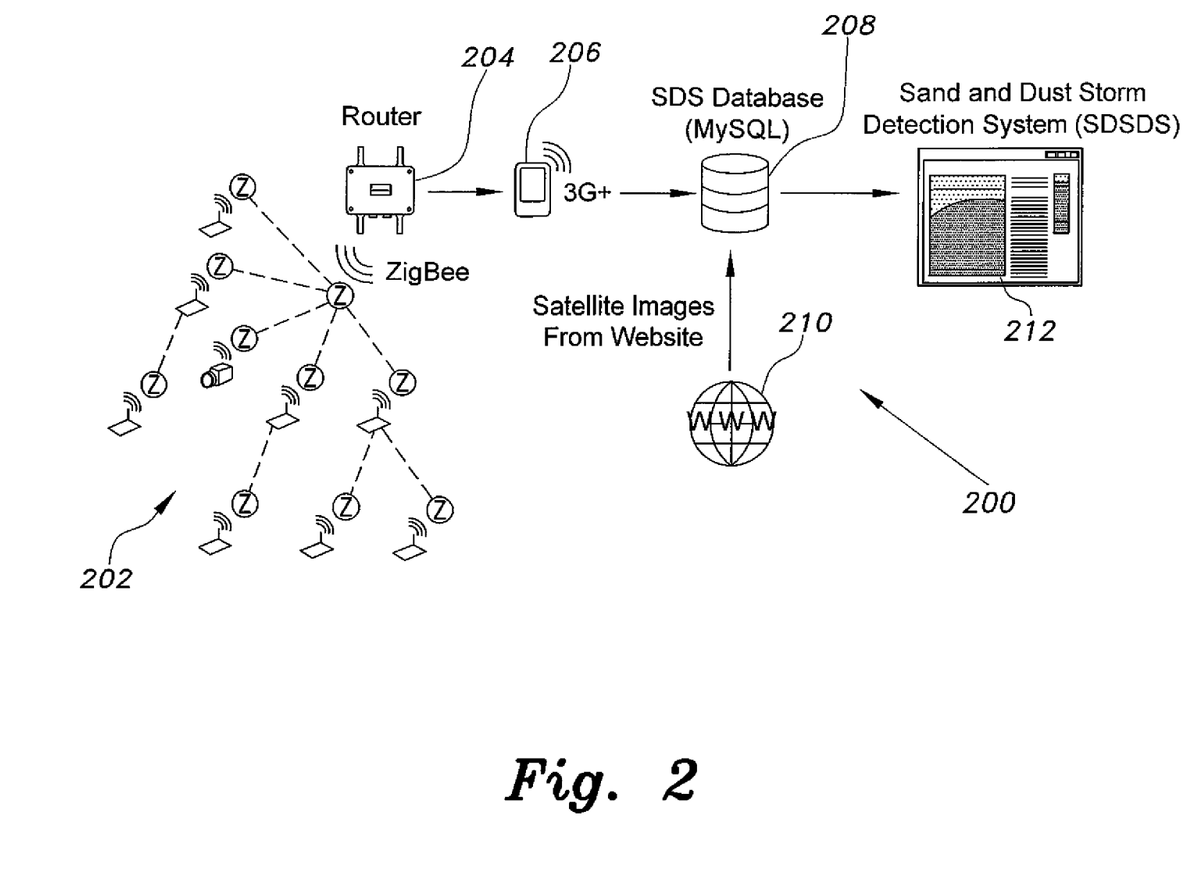
FIG. 2 is a block diagram of the components of a sand and dust storm detection system according to the present invention.

2. SDSDS the sand and dust storm detection system) 212 uses this database 208 to detect any SDS, and then issues an early warning accordingly.

The Adapter Layer (shown in FIG. 1) works like a client wrapper for different SDS technologies, such as sensory information and satellite imaging. It serves as a device driver that allows different SDS technologies to work with the middleware seamlessly.

The SDS Database is a MySQL database, which contains the data provided by WSN and satellite imaging. The WSN provides data on sensor ID, timestamp, sensor location, atmospheric pressure, surface temperature, humidity, wind velocity, and soil moisture. The satellite images are near-real time Meteosat RGB Composites Dust images taken from their web site every hour.

The Middleware is responsible for a number of functions, including (1) the retrieval and processing of raw data from WSN and satellite images; (2) preprocessing of the data in order to resolve any conflicts, reject outliers, and make inference; and (3) storing, sharing, distributing, and publishing the SDS data to different systems, services or applications.

The Reasoning Engine infers the existence of any SDS in the area of interest using both WSN data and images. It first uses the recently taken Meteosat image to detect any large-scale SDS in the area close by the WSN and stores the results. It then uses several recent results to detect any long-term SDS in the area. It is very easy to determine SDS from these images using digital image processing (DIP) techniques because dust is indicated by higher red fraction in the RGB images. Finally, it uses WSN data in order to infer any short-term or small-scale SDS in the area using first-order logic.

Based on the findings of the Reasoning Engine, the SDSDS 212 issues an SDS warning as follows: (1) a severe warning is issued if SDS is detected by both WSN and satellite images; (2) no warning is issued if SDS is not detected by any of the two; (3) a warning of short-term and small-scale SDS is issued when a dust event is detected by WSN only; and (4) a warning of long-term and large-scale SDS is issued when a dust event is detected by satellite images only.

Figure 5A:
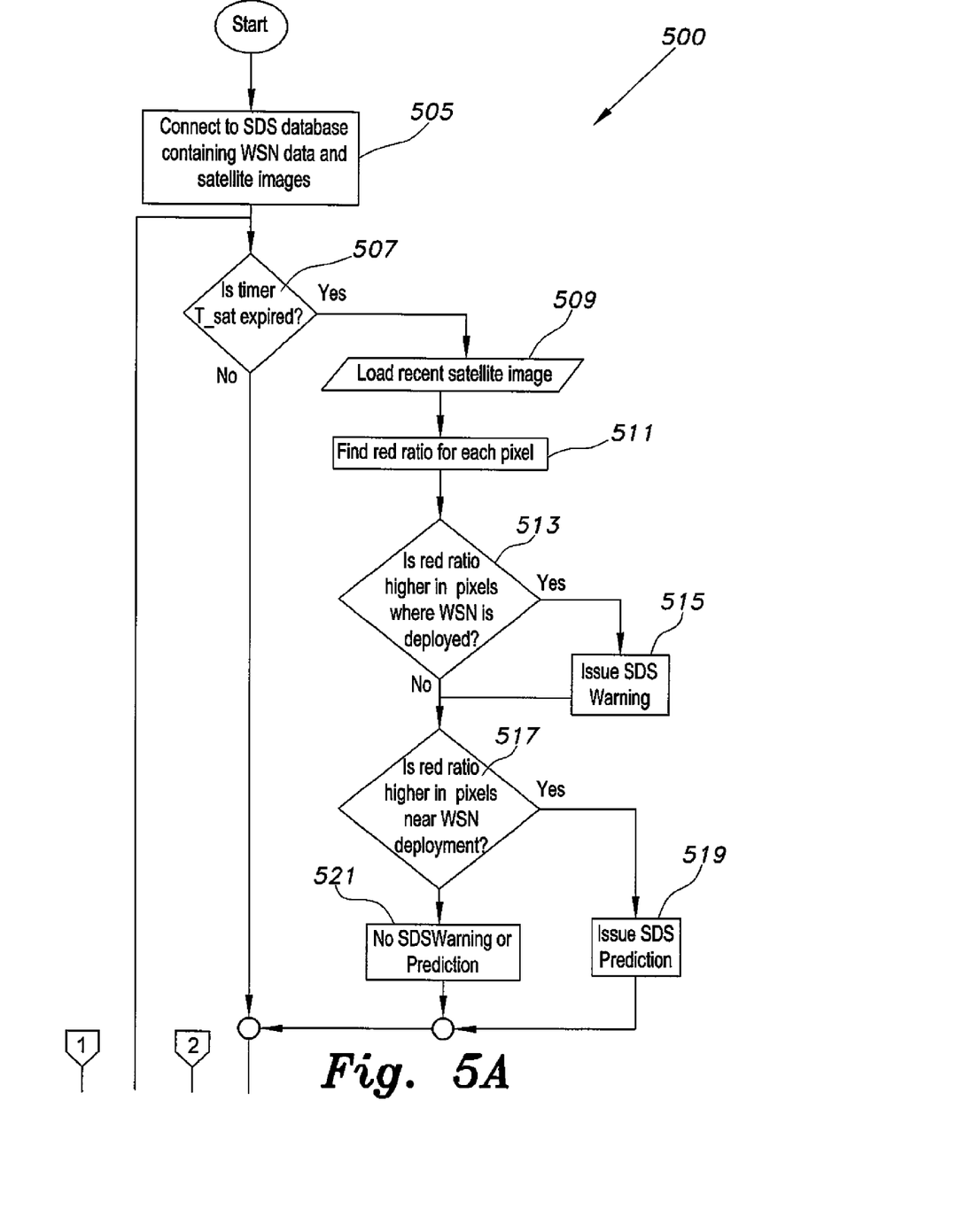
FIGS. 5A-5B show a flowchart of the steps in the sand and dust storm detection method according to the present invention.
Figure 5B:
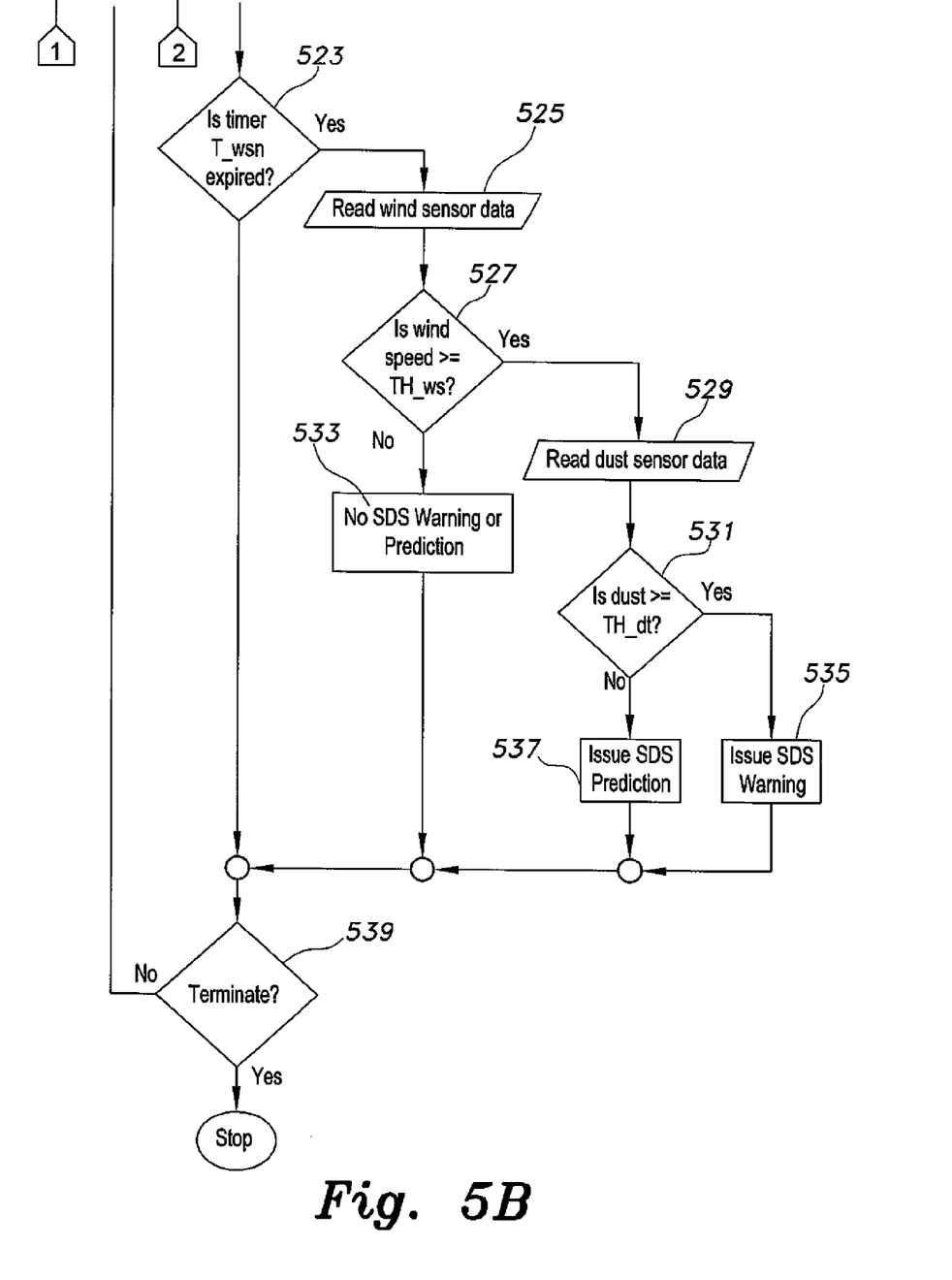

Processing methods are as shown in the flowchart of FIGS. 5A-5B. After start up, as shown in step 505, the system connects to the SDS database that contains WSN data and satellite images. A timer expiration check is performed at step 507, and when the timer T_sat expires (e.g., after every hour), the system, at step 509, loads the recent satellite image from the database. At step 511, it finds the red ratio for each pixel. At step 513, the pixel check determines if the red ratio is higher (i.e., the pixels are pinky) for the pixels where WSN is deployed. If the red ratio criterion is met, an SDS warning is issued at step 515. However, at step 517, the system determines whether the red ratio is higher in pixels near the area of WSN deployment, and if so, at step 519, issues an SDS prediction. Otherwise, at step 521, execution passes through with no SDS warning or prediction.

Another, timer, T_wsn, is checked at step 523. After timer T_wsn expires (e.g., after every minute), step 525 is performed in which the system reads wind sensor data from the database 208. Wind threshold checking step 527 determines if the wind speed reaches a threshold TH_ws (which depends on the local geographic region), and if so, then at step 529, the system reads the recent dust sensor data from the database 208. At step 531, the system determines if the amount of dust in the air reaches a threshold TH_dt. If the threshold TH_dt is reached, step 535 issues a SDS warning. Otherwise, at step 537, the system makes an SDS prediction and keeps all the sensors active in order to continuously monitor the environment. However, if the wind speed is lower than TH_ws, the system puts all the sensors to sleep mode, except the wind speed sensor. The system continues to loop through the aforementioned steps until termination is caused at step 539.

An experimental prototype of the proposed system is implemented in order to evaluate its performance. A multi-hop network of sensor nodes is deployed in the field. These nodes consist of Libelium Waspmotes, which use the IEEE 802.15.4/ZigBee compliant RF transceiver, have an outdoor range of 75 m to 100 m, provide a data rate of about 250 kbps, and have 8 MHz ATmega1281 microcontroller with 8 KB SRAM and 128 KB external flash.

The system requires five types of sensors onboard to collect information on atmospheric pressure, surface temperature, humidity, wind velocity, and soil moisture. A camera is also installed to get a real-time view of the field when required. The nodes use an Agriculture PRO (Libelium Waspmotes) board, which can host different sensors, except satellite imaging. The detail of these sensors is shown in Table 1.

TABLE 1

Sensors used in SDSDS system.

| Sensor | Model/type |
| --- | --- |
| Temperature Sensor | MCP9700A |
| Atmospheric Pressure Sensor | MPX4115A |
| Humidity Sensor | 808H5V5 |
| Soil Moisture Sensor | Watermark |
| Wind Speed and direction | Weather Station |
| Image Sensor | CMOS camera |
| Satellite imaging | Meteosat MSG (RGB Composites Dust) |

As shown in FIG. 2, a total of nine nodes, including a CMOS video camera, are pseudo-randomly deployed in an open area. The nodes make a multi-hop network using ZigBee digital radios. Each node is put in the middle of a 3D-weaving of 3 sticks to keep the node about ⅓ m above the surface.

The nodes are connected to a wireless router through ZigBee. The router is Meshlium, which is a Linux mesh router with ZigBee communication interface. It has another interface for 3G+. The router has a 500 MHz processor, 256 MB RAM and 8 GB storage capacity.

The router serves as a sink for all the data transmitted over the network. The data is then sent to the base station, having a PC with 3G+ interface. A MySQL database is maintained to store the sensor data and satellite images for reasoning. Meteosat MSG satellite provides RGB Composites Dust images every hour.

The system uses a very simple technique in order to save energy. Since strong wind velocity is a necessary (but not sufficient) condition for SDS, only the wind velocity sensor is kept active all the time. All other sensors on the board are kept in sleeping mode. Whenever, the wind velocity rises above a threshold value, all other sensors are put into active mode. This threshold-based activation is an effective energy-saving measure. Moreover, due to threshold-based activation, WSN transceivers can be commanded to sleep mode in order to avoid overhearing and unnecessary transmissions and receptions.

Figure 3:
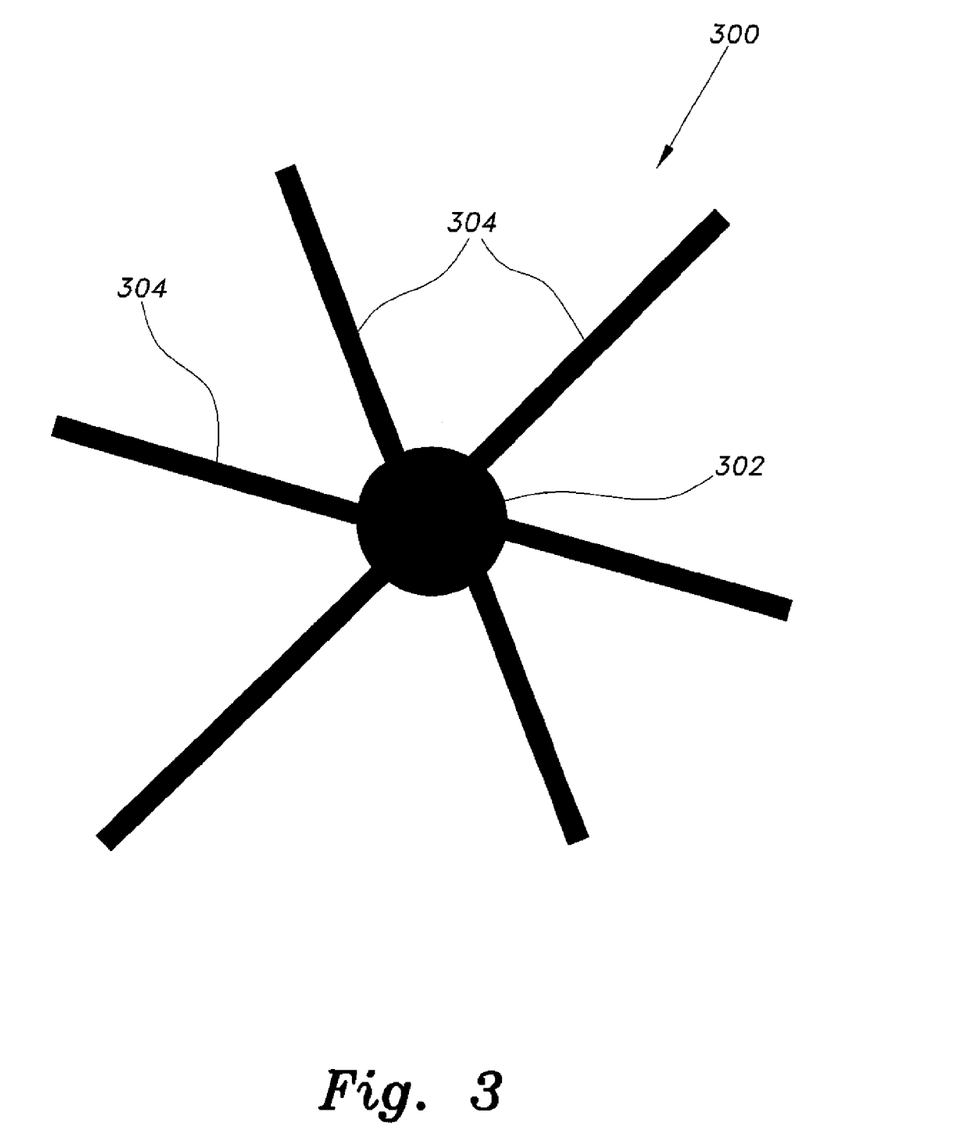
FIG. 3 is a diagram of a 3-D weave mount of a sensor node of the system of FIG. 2.

Sensor burial during SDS is avoided by installing them a few meters high on poles, or in the middle of a 3D-weaving 300 of 3 sticks 304, as shown in FIG. 3. In 3D-weaving, a node 302 is put in the middle of a 3D-weaving of 3 sticks 304 to keep it about ⅓ m above the surface. This method is very useful when nodes are thrown from the air.

Installing nodes on a 3D-weaving of 3 sticks gives some height above ground to the nodes. This height increases their communication range, which can be helpful during SDS when signal attenuation increases, and hence communication range decreases.

The packet delivery ratio decreases with the decrease in communication range due to sand and dust particles in air during SDS event. However, it remains above 0.9 until the communication range drops to 50 m. The packet delivery ratio decreases with an increase in the number of packets on the network.

The poor resolution of satellite images is compensated by using the images from Meteosat RGB Composites Dust for Eastern Africa, which are preprocessed for RGB components. The present method applies very simple DIP techniques to find the red component ratio for each pixel. A higher red ratio indicates the presence of dust.

Context fusion is done by the middleware. It resolves any conflicts and fuses the context information from multiple sources, i.e., WSN and satellite. After fusion, data from different sources actually support each other in detecting SDS of all types.

In the present sand and dust storm detection system, a dust event detected in satellite images means that a large-scale dust storm exists. This information is used to activate all sensors in the WSN to detect short-term or small-scale dust events. For video data to be compressed and transported over WSN, MPEG-4 (MPEG-4 Part 2) and H.264 (MPEG-4 Part 10) codecs are compared in terms of peak signal-to-noise ratio (PSNR) and end-to-end delay. PSNR determines the frame-by-frame error between the received frame and the original frame using the following formulae for the $n^{th}$ frame:

$$PSNR(n)_{dB} = 20\log_{10}\left(\frac{V_{peak}}{MSE}\right), \quad (1)$$

where MSE is the mean square error and $V_{peak}=2^k-1$, where k is the number of bits per pixel. If the PSNR value is greater than 37.0, then it is a good quality video frame. However, a PSNR value less than 20.0 means a very bad video frame.

In a comparison between PSNR values for H.264 and MPEG-4 codecs when applied to the same source video, it was determined that H.264 produces a smoother video as compared to MPEG-4. Moreover, the traffic generated by MPEG-4 is about 3.5 times higher than H.264. Therefore, the network may face congestion, and hence higher end-to-end delay for MPEG-4 when compared to H.264. Observation of the end-to-end delay for UDP packets of the video frames generated by H.264 and MPEG-4 reveals that MPEG-4 has higher end-to-end delay for most of the frames (average=0.4428 sec) because it generates larger frames, which require more time to transmit through UDP packets on the network. Therefore, H.264 is more efficient, as it gives less end-to-end delay for most of the frames (average=0.0659 sec). Hence, H.264 is used in the present system because its videos are smoother, smaller, faster, and of better quality.

Figure 4:
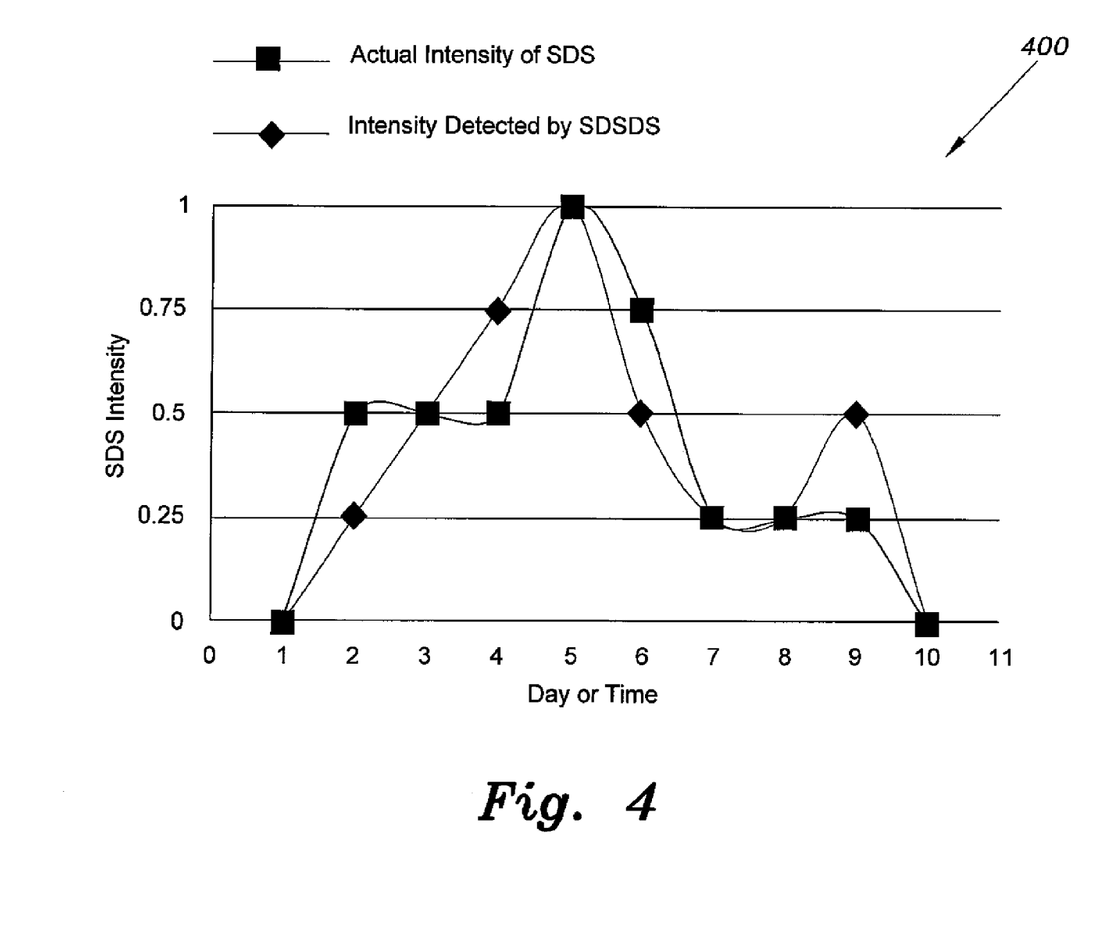
FIG. 4 is a plot showing the accuracy of a sand and dust storm detection method according to the present invention.

For satellite images, the present system finds the ratio of red component for each pixel, where a higher red ratio indicates dust. This is a very simple, fast and accurate method. The data from the WSN is stored in a MySQL database. Simple SQL queries are used to manipulate the data. A higher value in the wind velocity column is used as a potential indicator of a dust storm in the region of interest, while other parameters are used to confirm it. Plot 400 of FIG. 4 compares the actual intensity of an SDS measured by dust sensors and the intensity detected by the present system. Results show that the proposed system is fairly accurate.

It is to be understood that the present invention is not limited to the embodiments described above, but encompasses any and all embodiments within the scope of the following claims.

We claim:

1. A computer-implemented sand and dust storm detection method, comprising the steps of:
    storing GPS, atmospheric pressure, surface temperature, humidity, wind velocity, and soil moisture readings obtained from a wireless sensor network (WSN) to a database in substantially real time;
    storing near-real time Meteosat RGB Composite Dust images obtained from an orbital satellite to the database, substantially in real time;
    activating all of the sensors in the WSN based on a dust event detected from the satellite images, the sensors in the WSN being adapted for detecting short-term/small-scale dust events;
    establishing context information by resolving any data conflicts among sensors in the WSN and between data from the sensors and data from analysis of the images;
    fusing the context information;
    drawing an inference from the WSN readings and the Meteosat RGB Composite Dust images, the inference determining whether or not a sand/dust storm exists in a locale in which the WSN is deployed, wherein the context information is used in formulating the inference about the existence of the sand/dust storm; and
    issuing an early warning of a sand/dust storm to a user based on the determination from the inference.

2. The sand and dust storm detection method according to claim 1, further comprising the step of using H.264 video codecs for the transmission of video data over the WSN.

3. The sand and dust storm detection method according to claim 1, further comprising the step of finding a ratio of red component to green and blue for each satellite image pixel, wherein a high red ratio indicates dust.

4. The sand and dust storm detection method according to claim 1, further comprising the steps of:
    using an increase in value of detected wind velocity as a potential indication of a dust storm in a region of interest; and
    using additional sensor and image parameters to confirm the potential indication.

5. The sand and dust storm detection method according to claim 1, further comprising the steps of:
    issuing a severe warning if a sand/dust storm is detected by both WSN and satellite images;
    issuing no warning if no sand/dust storm is detected by either the WSN or the satellite images;
    issuing a short-tend and small-scale warning if a sand/dust storm is detected by the WSN but not by the satellite images; and
    issuing a long-term and large-scale warning if a sand/dust storm is detected by the satellite images but not by the WSN.

6. A dust storm detection system, comprising:
means for storing GPS, atmospheric pressure, surface temperature, humidity, wind velocity, and soil moisture readings obtained from a wireless sensor network (WSN) to a database in substantially real time;
means for storing near-realtime Meteosat RGB Composite Dust images obtained from an orbital satellite to the database in substantially real time;
means for activating all of the sensors in the WSN based on a dust event detected from the satellite images, the sensors in the WSN being adapted for detecting short-term/small-scale dust events;
means for establishing context information by resolving any data conflicts among sensors in the WSN and between data from the sensors and data from analysis of the images;
means for fusing the context information;
means for drawing an inference from the WSN readings and the Meteosat RGB Composite Dust images, the inference determining whether or not a sand/dust storm exists in a locale in which the WSN is deployed, wherein the context information is used in formulating the inference about the existence of the sand/dust storm; and
means for issuing an early warning of a sand/dust storm to a user based on the determination from the inference.

7. The sand and dust storm detection system according to claim 6, further comprising:
means for finding the ratio of red component for each satellite image pixel, wherein a higher red ratio indicates dust;
means for using a higher value of detected wind velocity as a potential indication of a dust storm in a region of interest;
means for using additional sensor and image parameters to confirm said potential indication;
means for issuing a severe warning if said sand/dust storm is detected by both WSN and satellite images;
means for issuing no warning if no sand/dust storm is detected by neither WSN nor satellite images;
means for issuing a short-term and small-scale warning if said sand/dust storm is detected by said WSN but not by said satellite images;
means for issuing a long-term and large-scale warning if said sand/dust storm is detected by said satellite images but not by said WSN; and
means for suspending said WSN sensors a predetermined minimum height above the ground.

* * * * *